United States Patent [19]

Ford

[11] Patent Number: 4,513,237
[45] Date of Patent: Apr. 23, 1985

[54] ENERGY EFFICIENT MULTI-PHASE DUAL VOLTAGE ELECTRIC MOTOR

[76] Inventor: Horace B. Ford, 715 Nassau Bay II, Granbury, Tex. 76048

[21] Appl. No.: 594,688

[22] Filed: Mar. 29, 1984

[51] Int. Cl.³ ............................................. H02P 7/48
[52] U.S. Cl. .................................. 318/768; 318/773
[58] Field of Search ................ 318/768, 773, 771, 757

[56] References Cited

U.S. PATENT DOCUMENTS

| | | | |
|---|---|---|---|
| 2,456,538 | 12/1948 | Seeger et al. | 318/768 |
| 2,959,721 | 11/1960 | Butler et al. | 318/757 |
| 3,201,673 | 8/1965 | Williford et al. | 318/768 |
| 3,673,480 | 6/1972 | Johnstone | 318/768 |

Primary Examiner—David Smith, Jr.
Attorney, Agent, or Firm—Arthur F. Zobal

[57] ABSTRACT

A circuit which enables a three phase, Y connected motor to be operated on either one phase or three phase power at either 230 or 460 AC line voltage. A modified circuit includes power factor correction capacitor banks for increasing the power factor and efficiency of the motor whether connected for one phase or three phase operation at either line voltage.

10 Claims, 21 Drawing Figures

FIG. 14
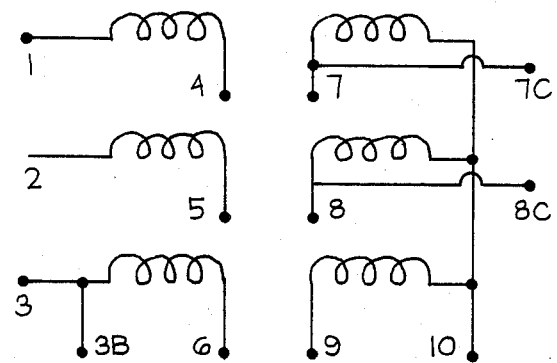
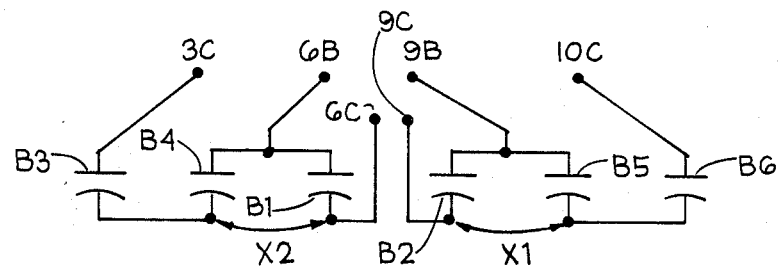
FIG. 15

FIG. 18
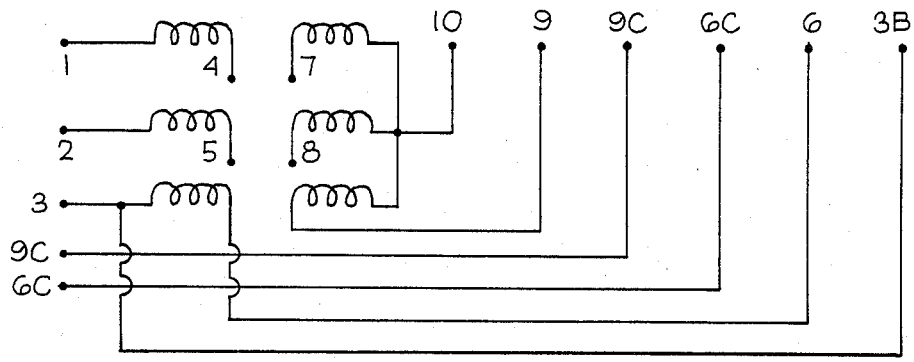
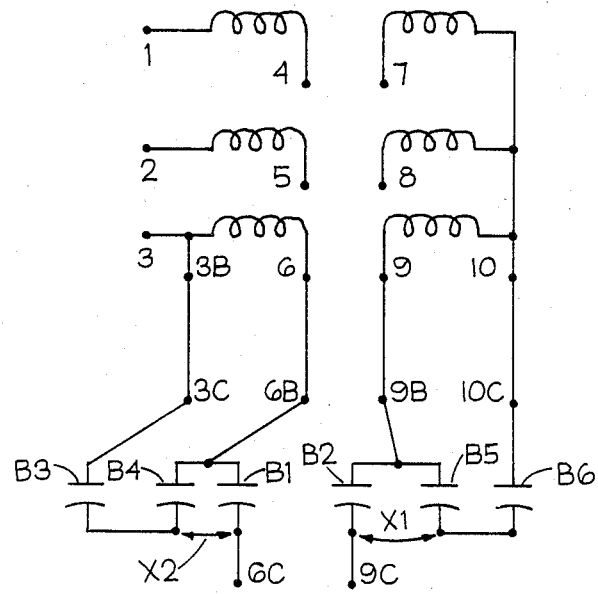
FIG. 19

1

ENERGY EFFICIENT MULTI-PHASE DUAL VOLTAGE ELECTRIC MOTOR

BACKGROUND OF THE INVENTION

Description of the Prior Art

One phase electric motors commonly in use are rated for 115/230 volts AC or 230/460 volts AC, or one of these three voltages. Three phase electric motors commony in use are rated for 230/460 volts AC. Motors may be wound for any desired voltage. There is also in use a multi-phase electric motor which will operate on one phase or three phase power at one voltage level. U.S. Pat. No. 3,201,673 discloses a three phase motor connected for single-phase operation.

SUMMARY OF THE INVENTION

It is an object of the invention to provide a circuit which allows a three phase, Y connected induction motor (available at any R.P.M. or H.P.) to be operated on either one phase or three phase power at two different AC voltage levels. Thus the invention allows the motor to be dual voltage and multi-phase.

It is a further object of the invention to provide a circuit which will allow the motor to operate at high efficiency and high power factor at either one phase or three phase power.

It is also an object of the invention to provide high torque one phase motors in horsepower sizes (larger than 15 H.P.) not available in other one phase motors.

It is a further object of the invention to provide a one phase motor in R.P.M. ratings not available in other one phase motors, for example, 1,200, 900, and 600 R.P.M.

The invention is useful and valuable in those applications where the power voltage or number of phases is not known to the manufacturer. For example, the manufacturers of machine tools, pumps, air compressors, or any machine need not be concerned with the power source if the machine is powered with a motor incorporating the invention. In addition, the invention is useful in those applications where the equipment is moved from location to location, and the power source is different at different locations.

BRIEF DESCRIPTION OF THE DRAWINGS

FIG. 14 is a drawing of Y connected, stator windings similar to that of FIG. 3 with suitable leads to allow the circuit of FIG. 15 to be connected to the windings.

FIG. 15 illustrates the running capacitors of the circuit of FIG. 11 employed for increasing the power factor and efficiency of an AC, Y connected, three phase induction motor wherein the windings are connected for three phase operation.

FIG. 18 is a drawing of Y connected stator windings similar to that of FIG. 3 with suitable leads to allow the circuit of FIG. 15 to be connected to the windings for one phase operation with mechanical starting.

FIG. 19 illustrates the circuit of FIG. 15 connected to the stator windings of an AC induction motor wherein the windings are connected for one phase operation and the motor is of the type which is started mechanically.

DESCRIPTION OF THE PREFERRED EMBODIMENTS

Figure 1:
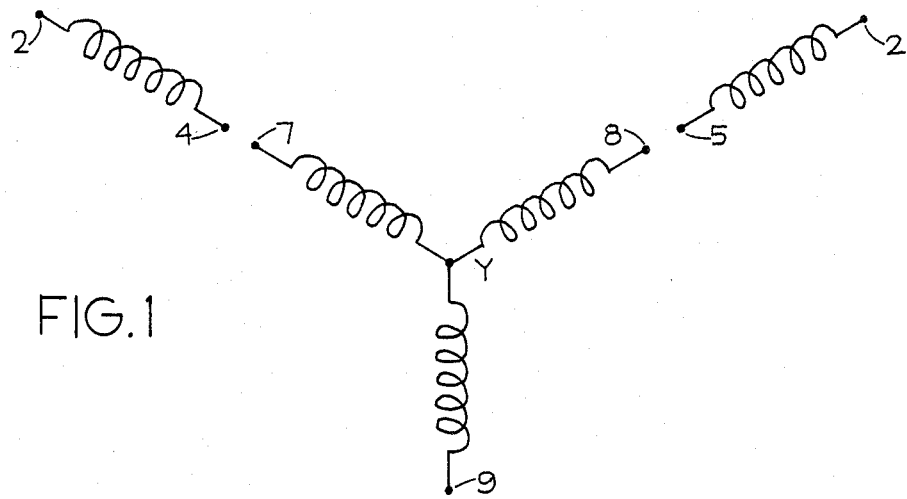
FIG. 1 illustrates the conventional nine lead, Y connected stator windings of an AC induction motor.
Figure 2:
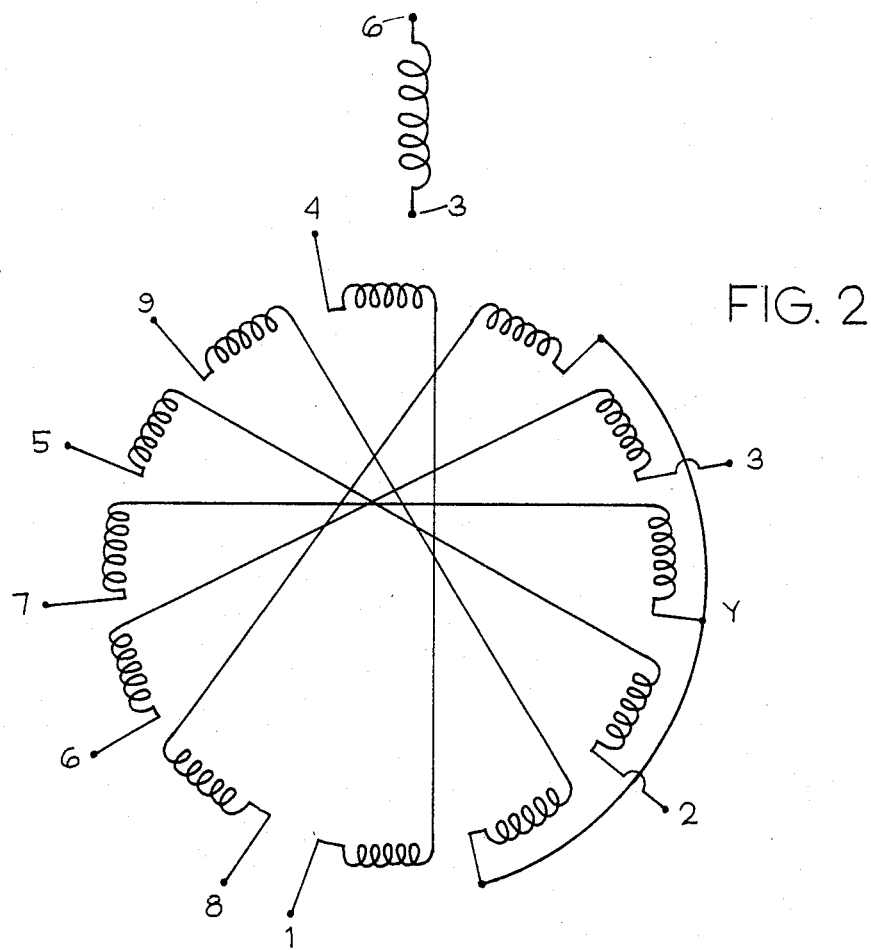
FIG. 2 illustrates three phase, Y connected stator windings of a four pole induction motor.
Figures 3, 4:
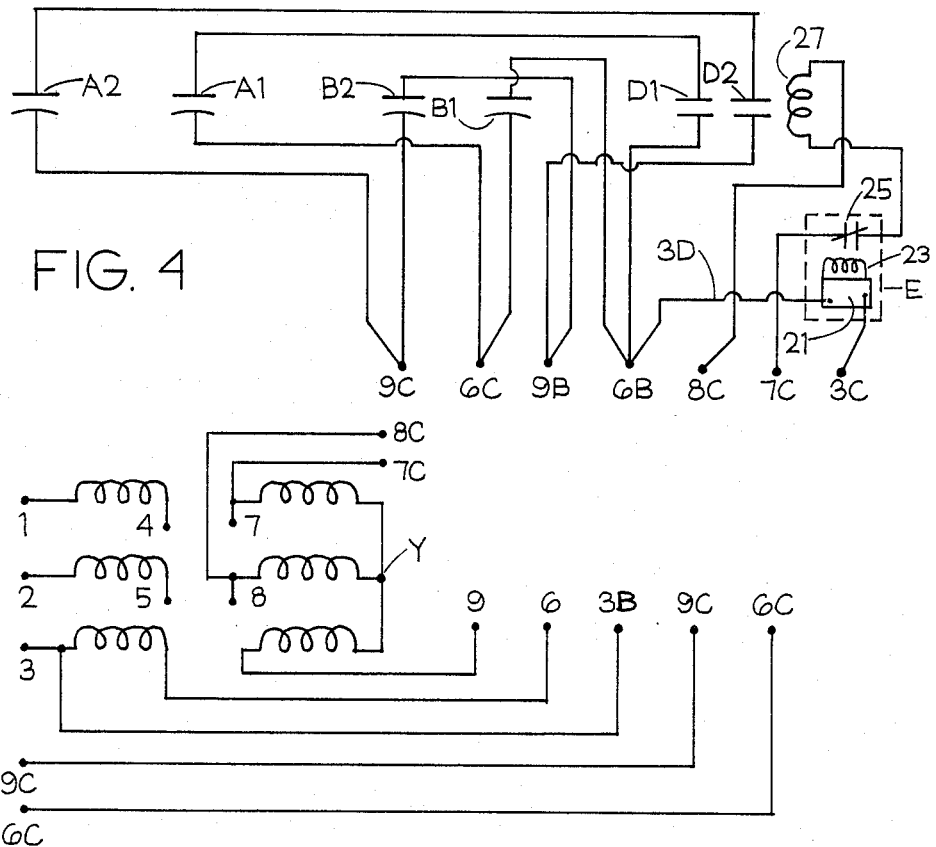
FIG. 3 shows another way of illustrating the stator windings of FIG. 1 with additional leads to allow the circuit of FIG. 4 to be connected to the windings.
FIG. 4 is a circuit of the invention for allowing a three phase induction motor having nine lead, Y connected stator windings, to be connected as a one phase motor at either of two different levels of line voltage.

Referring to FIGS. 1–3, there is illustrated the conventional nine lead, Y connected stator winding of a three phase AC induction motor. The three windings 1-Y, 2-Y, and 3-Y are connected together at a common point indicated at Y and are wound on the stator such that the three windings define the three phases respectively. Each of the three windings comprises two winding sections such that each section defines one half of a phase. In this respect, winding 1-Y comprises winding sections 1–4 and 7-Y; winding 2-Y comprises winding sections 2–5 and 8-Y; and winding 3-Y comprises winding sections 3–6 and 9-Y. Numbers 1–9 represent external electrical leads of the windings. Each winding has two winding sections to allow the motor to be connected to operate at either 230 or 460 volts AC. In FIGS. 1 and 3, the poles of the winding are not indicated, however, FIG. 2 illustrates a Y connected stator winding of a three phase, four pole induction motor. Preferably, the motors with which the invention is to be used are four pole motors, however, it is to be understood that the motors could have a different number of poles such as two poles, six poles, etc. In the drawings, the rotor of the motor is not shown, however, preferably it will be a conventional squirrel cage rotor. The number of winding slots which the stator has may vary, however, typically the stator will have 36 slots.

The polarity of a three phase winding is such that when one phase power is applied across any one phase, or two phases in series, as in a Y connected winding; a one phase main winding of the correct polarity is established. Without more, however, the motor will not start. The third phase may be used, with capacitance in series as a starting winding. This principle is present in all static type phase converters. The invention uses this principle, however, it employs concepts and features which are novel and different than either an ordinary one phase motor or a static converter used with a three phase motor.

Figure 5:
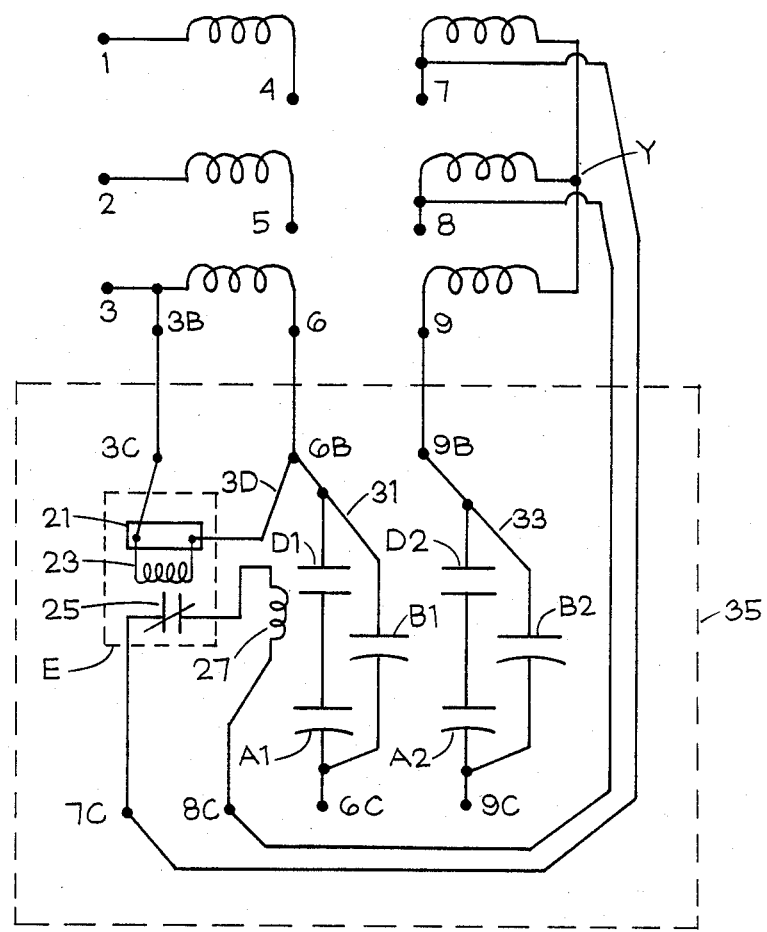
FIG. 5 illustrates the circuit of FIG. 4 partially connected to the windings of FIG. 3 for one phase operation.

Referring to FIG. 3, leads 3B, 9C, and 6C are provided with the motor for allowing the circuit of FIG. 4 to be connected to the stator windings. The circuit of FIG. 4 will be enclosed in a box which will be mounted on the motor or motor support. The circuit comprises terminals at 9C, 6C, connectable to leads 9C and 6C of FIG. 3. In addition, there are provided terminals 9B and 6B and leads 8C, 7C, 3C, and 3D. A relay E and control circuit is provided which comprises a rectifier 21 having inputs connected to leads 3C and 3D and having outputs coupled to a solenoid coil 23 which in turn controls normally closed contacts 25 located in lead 7C. Leads 7C and 8C are connected to opposite ends of another solenoid coil 27 which controls normally open contacts D1 and D2. A similar relay and control circuit is disclosed in U.S. Pat. No. 4,378,520. A1 and A2 are starting capacitors and B1 and B2 are running capacitors. The circuit normally will be connected as shown in FIG. 5 wherein 3C is connected to 3B; 6B is connected to 6; 9B is connected to 9; 7C is connected to 7; and 8C is connected to 8. Thus two starting and running circuits 31 and 33 are provided with circuit 31 being connected to 6 and circuit 33 being connected to 9. Circuit 31 comprises a starting circuit including normally open contacts D1 and starting capacitor A1 and a running capacitor B1 which is connected in parallel with D1 and A1. Circuit 33 comprises a starting circuit including normally open contacts D2 and a starting capacitor A2 and a running capacitor B2 which is connected in parallel with D2 and A2. The circuit of FIG. 5 can be connected to a three phase motor for one phase operation on either 230 volts AC or 460 volts AC. Operation of the three phase motor as a one phase motor off of 230 line volts AC will be described first.

Figure 6:
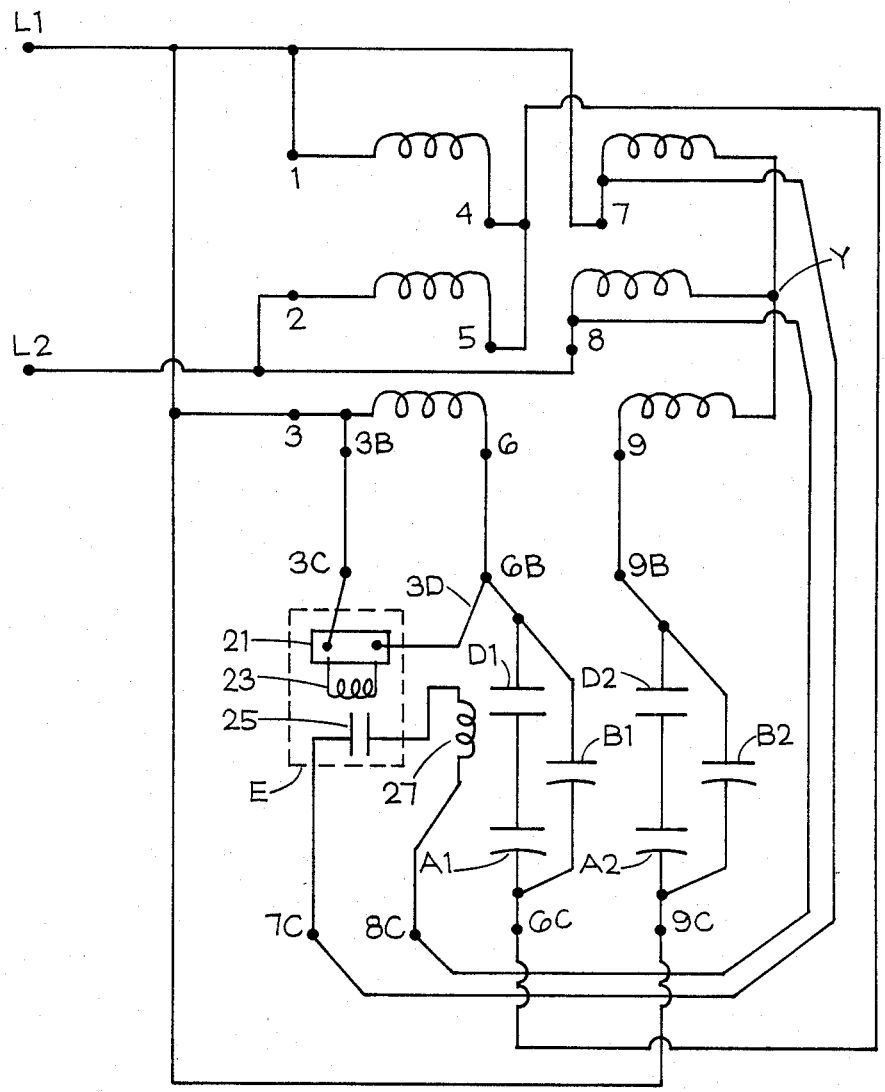
FIG. 6 illustrates the circuit of FIG. 4 connected to the windings of FIG. 3 for one phase operation at 230 AC line voltage.

Referring to FIG. 6, L1 and L2 are line voltage leads which in this embodiment carry 230 volts AC. For 230 volts AC, one phase connection, L1 is connected to 1, 7, 3, and 9C and L2 is connected to 2 and 8. Leads 4, 5, and 6C are connected together. This connection provides a circuit from L1 to 1 to 4 to 5 to 2, and to L2 which is correct for 230 volts. Another circuit is established and paralleled with the first circuit from L1 to 7 to Y to 8 and to L2 which also is correct for 230 volts. These connections establish a main winding for a one phase motor. Another circuit starts at L1 to 3, to 6 to normally open contacts D1, to starting capacitor A1, to 6C which is connected to leads 4 and 5. Still another circuit starts at L1 to 9C (in the reverse direction), to starting capacitor A2, to the other normally open contacts D2, to 9, and to the Y connection. Running capacitor B1 is connected from 6B to 6C and running capacitor B2 is connected from 9C to 9B. The running capacitors B1 and B2 remain in the circuit when the starting capacitors A1 and A2 are relieved by the contactors D1 and D2 after the motor has started. This second set of circuits (starting with 3 and 9C) establish a starting winding for the motor. These two circuits of the starting winding, connected in this manner are in parallel with one another and in series with one half of the main winding. This connection increases the current through this one half of a main winding and results in an increase in the starting and running torque for whichever direction the motor is rotating. Rotation can be reversed by connecting leads 3 and 9C to L2 rather than to L1. Since the starting circuits connect from L1 (or L2) to the center of the running winding, the voltage applied to the starting and running capacitors is approximately one half line voltage. This increases the life for these components greatly. Leads 7 and 8 connect to 7C and 8C which furnish 230 volts to the coil 27 through normally closed contacts 25 of relay E. By connecting leads 7C and 8C to leads 7 and 8 of the winding, 230 volts is applied to the coil 27 whether the motor is operating on 230 or 460 volts AC. This occurs since any given number of turns a winding has the same voltage across it when the winding in energized whether connected to 230 or 460 volts. The rectifier 21 and coil 23 of relay E is supplied from points 3B and 6 of the winding and will have the same voltage whether the motor is operating on 230 or 460 volts.

At the same time that 230 volts is applied to L1 and L2 and 230 volts is applied to 8C and 7C; this voltage is applied to the coil 27 of contactors D1 and D2. The contactors D1 and D2 will close temporarily and the two circuits of the starting winding will be energized through the starting capacitors. The motor will rotate and as the motor comes up to full RPM; the relay E senses a counter EMF voltage at 3C and 6B which will cause the coil 23 to actuate and open the relay contacts 25 which causes the coil 27 of contacts D1 and D2 to deenergize thereby allowing the contacts D1 and D2 to return to the normal open positions. The starting capacitors A1 and A2 thus are removed from the circuit but the running capacitors B1 and B2 are left in the circuit. The three phase motor, by the action and connections as described above becomes a high torque, one phase, capacitor start-capacitor run motor.

Figure 7:
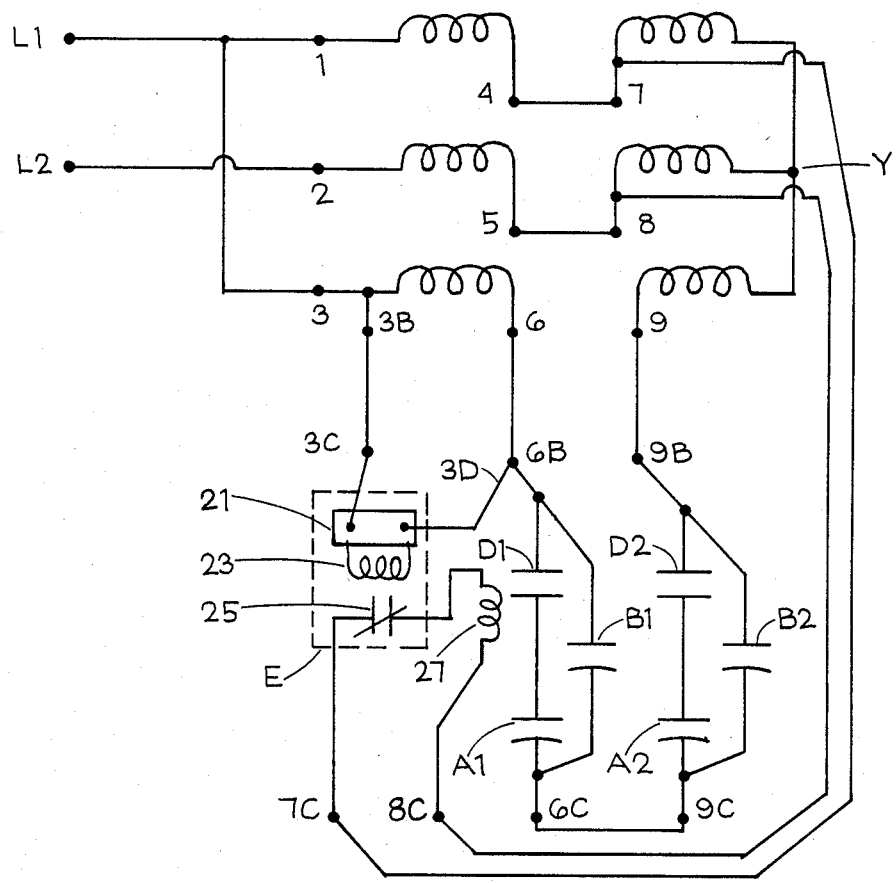
FIG. 7 illustrates the circuit of FIG. 4 connected to the windings of FIG. 3 for one phase operation at 460 AC line voltage.

Referring now to FIG. 7, there will be described the manner in which the motor and the circuit can be connected to operate off of a line voltage of 460 volts AC for one phase operation. In this embodiment L1 and L2 carry 460 volts AC. L1 is connected to 1, 3, and L2 is connected to 2. Leads 4 and 7, 5 and 8, and 6C and 9C are connected together. This connection provides a circuit starting from L1 to 1 to 4 to 7 to Y to 8 to 5 to 2, and to L2 which is correct for 460 volts. The above connection establishes a main winding for a one phase motor. Another circuit starts at L1 to 3 to 6 to 6B, to normally open contacts D1 to starting capacitor A1, to 6C to 9C, to the other starting capacitor A2, to the other normally open contacts D2, to 9B to 9, and to Y. The running capacitors from 6B to 6C and from 9C to 9B, by this connection, are placed in series. This second circuit (from L1 and 3 to Y) connects the windings and all of the components of the starting circuit in series and establishes a starting winding which is correct for 460 volts. The starting circuit, by connecting to Y, places the starting winding in series with one half of the running winding (as in the 230 volt connection), and increases the current through one half of the running winding, thus increasing the running and starting torque in whatever direction of rotation the motor is connected to rotate. The motor can be connected to rotate in a reverse direction on 460 volts by connecting lead 3 to L2 rather than to L1. Since any given number of turns on the winding has the same voltage across it when the winding is energized, whether connected for 230 or 460 volts (for example, from 7 to Y to 8) then the voltage at 7C and 8C is the same for both connections. The same is true of the voltage at 3C and 6B for rectifier 21 and coil 23.

Thus can be understood from the above description, a three phase induction motor can be made to operate as a dual voltage, capacitor start-capacitor run, high starting and high running torque, one phase electric motor. In order to make the connections from three phase to one phase or for operation on either 230 or 460 volts, the motor does not need to be disassembled but can easily be connected in the desired manner by the use of the leads as described above. The change is very simple to make.

Figure 8:
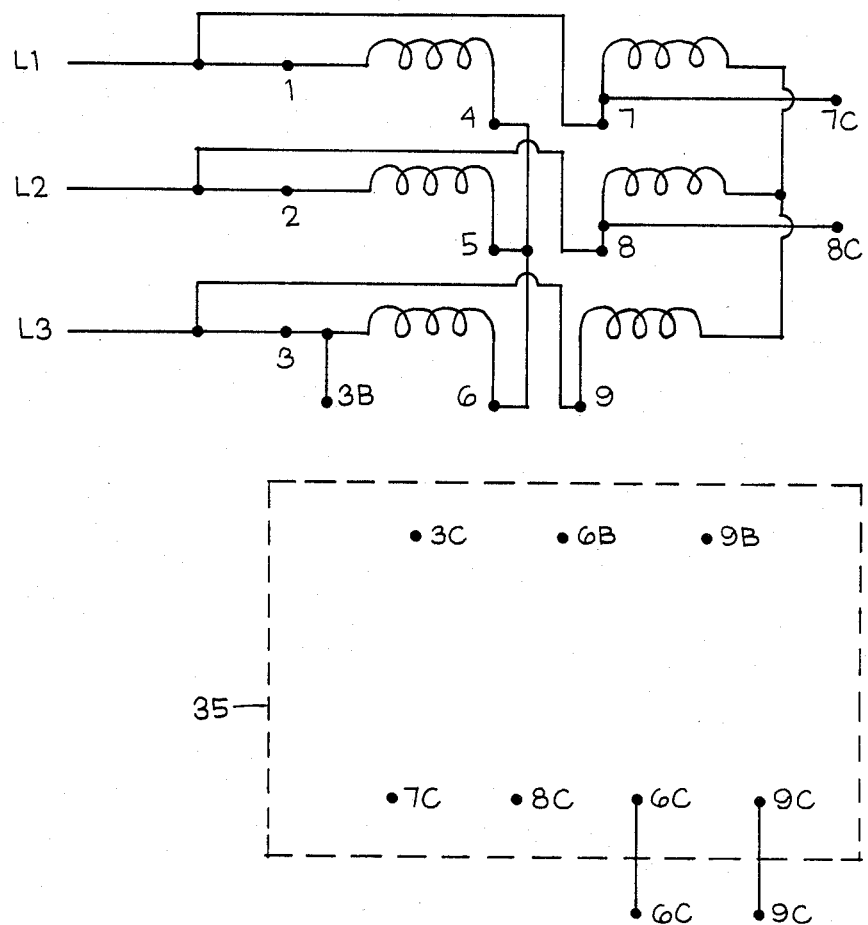
FIG. 8 illustrates the windings of FIG. 3 connected for three phase operation at 230 volts AC.
Figure 9:
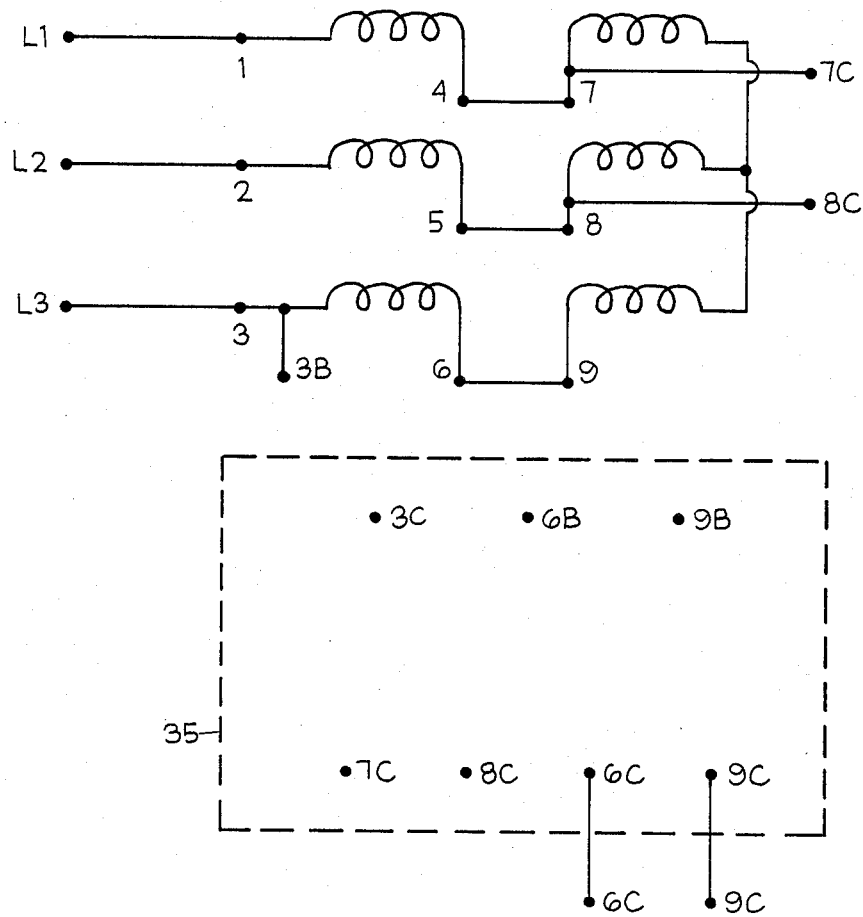
FIG. 9 illustrates the windings of FIG. 3 connected for three phase operation at 460 volts AC.

Referring now to FIGS. 8 and 9, these figures illustrate the changes made from a one phase motor connection to a three phase motor connection wherein the motor is operated off of 230 or 460 volts AC. In the embodiment of FIG. 8, L1, L2, are L3 will carry 230 volts AC. In the embodiment of FIG. 9, L1, L2, and L3 will carry 460 volts AC. The change can be made by disconnecting the components which are used for the one phase connection. The components shown in the dotted box 35 (see also FIG. 5) are not employed in the three phase connections of FIGS. 8 and 9. The three phase connection of FIGS. 8 and 9 also can be made directly without first connecting for one phase operation and then for three phase operation. In going from one phase to three phase operation, 3B, 7C, and 8C are disconnected from the terminal board and insulated. Leads 6 and 9 also are disconnected from the terminal board and leads 6C and 9C are insulated. This leaves nine external leads from the motor with standard three phase numbers. These nine leads are connected in the same manner as any standard three phase motor and the multiphase motor then will operate as a three phase motor. As shown in FIG. 8, for operation off of 230 volts connect L1 to 1 and 7; L2 to 2 and 8; and L3 to 3 and 9. Connect 4, 5, and 6 together. For 460 volts operation as shown in FIG. 9, connect L1 to 1; L2 to 2; and L3 to 3. Connect together 4 and 7, 5 and 8, and 6 and 9.

The motor will retain the design characteristics of whatever type of motor is used. For example, if a high slip three phase motor is used, it will be a high slip multiphase motor when connected to the circuits of the invention. The invention also could be used with a variable speed, slip ring, three phase motor, if the stator winding is correct.

Figure 10:
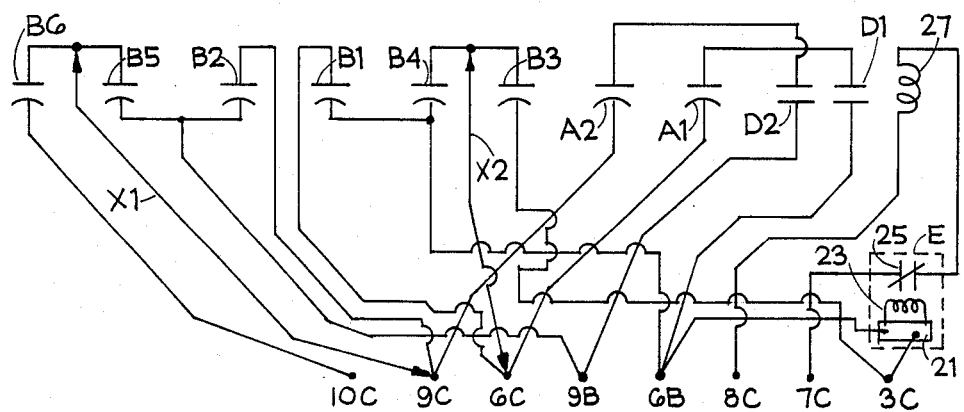
FIG. 10 is a modification of the circuit of FIG. 4 for increasing the efficiency and power factor of an AC induction motor.
Figure 11:
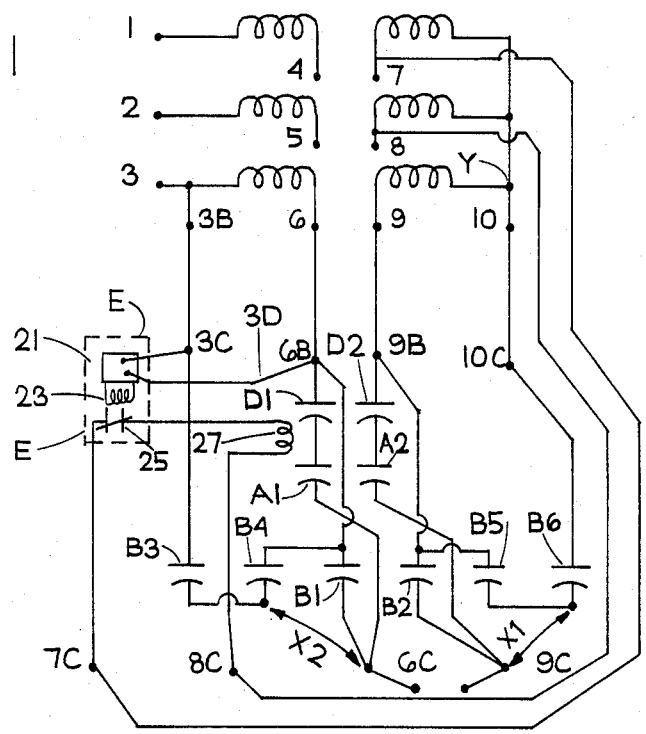
FIG. 11 illustrates the circuit of FIG. 10 partially connected to the windings of FIG. 3 for one phase operation.
Figure 12:
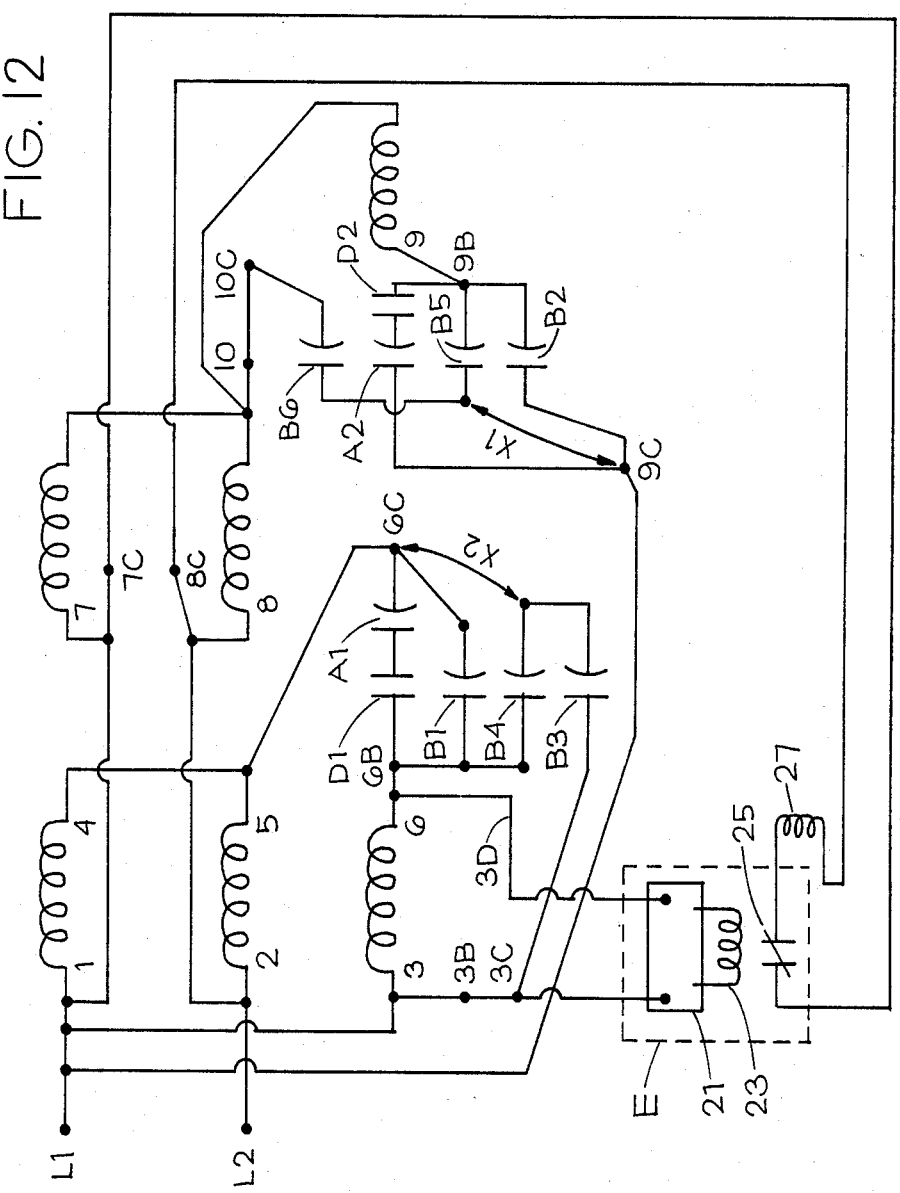
FIG. 12 illustrates the circuit of FIG. 10 connected to the windings of FIG. 3 for one phase operation at 230 AC line voltage.
Figure 13:
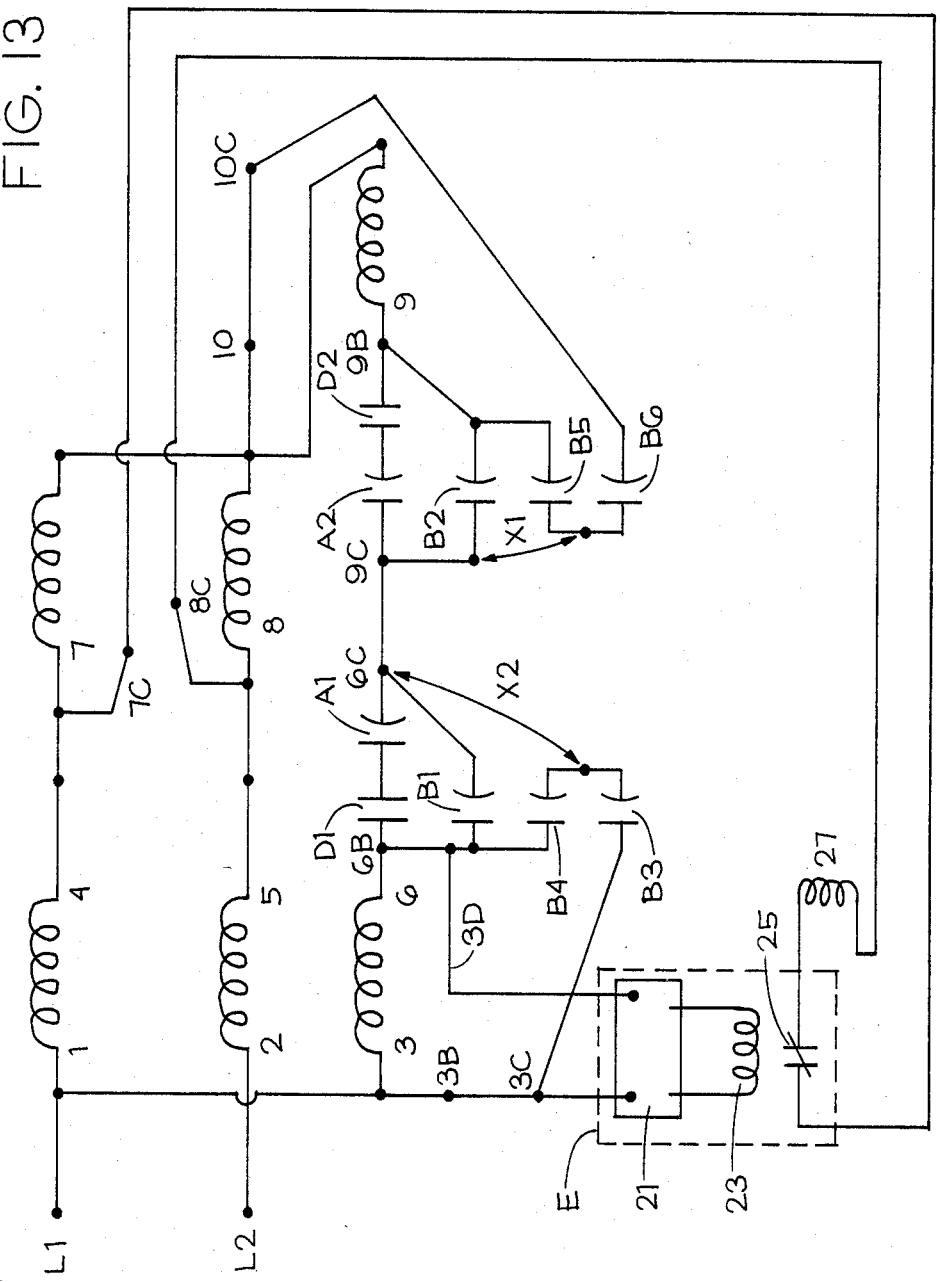
FIG. 13 illustrates the circuit of FIG. 10 connected to the windings of FIG. 3 for one phase operation at 460 AC line voltage.

Referring now to FIGS. 10 and 11, there is illustrated a modification of the circuit of FIGS. 4 and 5. The starting circuits are the same, however, six banks of running capacitors are provided instead of two. The four additional banks of running capacitors comprise capacitors B3, B4, B5, and B6. A running capacitor circuit comprising capacitor B3 is connected from 3C through removable jumper X2 to 6C. Another running capacitor circuit comprising capacitor B6 is connected from 9C through removable jumper X1 to the Y connection. Running capacitor B4 is connected across B1 by way of removable jumper X2 and running capacitor B5 is connected across B2 by way of removable jumper X1. FIGS. 12 and 13 illustrate the manner in which the three phase windings of the motor may be connected for one phase operation at either 230 or 460 volts AC. In order to connect the motor for rotation in a reverse direction for 230 volts, leads 3 and 9C will be connected to L2 rather than to L1 and for 460 volts, lead 3 will be connected to L2 rather than to L1. When the windings are connected for operation off of either 230 or 460 volts one phase, as shown in FIGS. 12 and 13 respectively, the two running capacitor circuits comprising the capacitors B3 and B6 become connected from the center of the main winding to L1 (or L2); and in parallel with one half of the starting winding for a 230 volt connection; and in parallel with all of the starting winding for a 460 volt connection. These running capacitor circuits (connected from L1 (or L2) to the center of the running winding) cause the current in one half of the running winding to shift out of phase with the current in the other one half of the running winding. At the same time, the running capacitors B1 and B4 and B2 and B5 connected in series with the starting winding (winding 3-6, 9-Y) cause a phase shift in this winding, which is different from the running winding. These phase shifts are similar to the rotating field of a three phase winding. At the same time, the capacitance connected in this manner causes the motor to operate at a very high power factor. The power factor and efficiency in the connection of FIGS. 10-13 are higher then the versions shown in the connection of FIGS. 4-7. Tests on experimental models indicate an efficiency of and power factor of higher than 90% possibly on some sizes as high as 95%.

Figure 16:
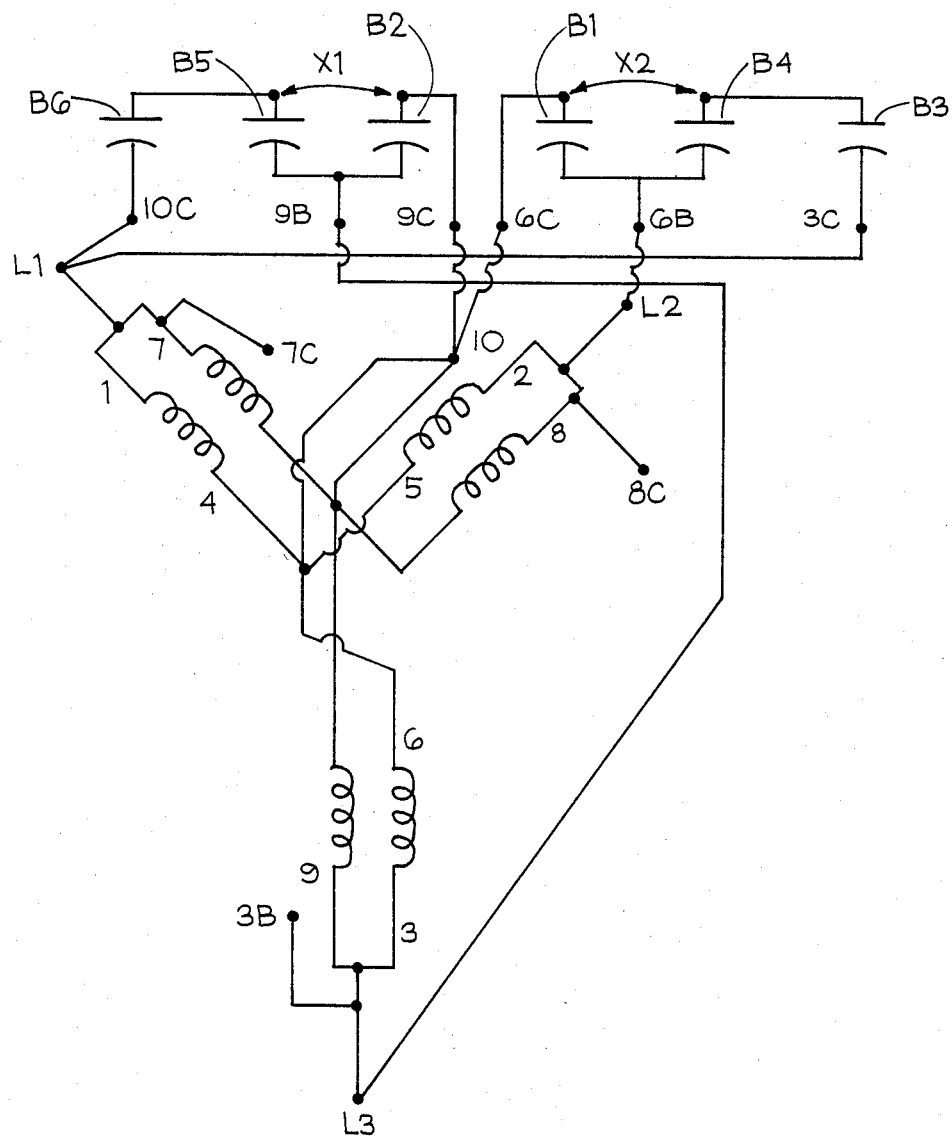
FIG. 16 illustrates the circuit of FIG. 15 connected to the stator windings of an AC induction motor wherein the windings are connected for three phase operation at 230 volts AC line voltage.
Figure 17:
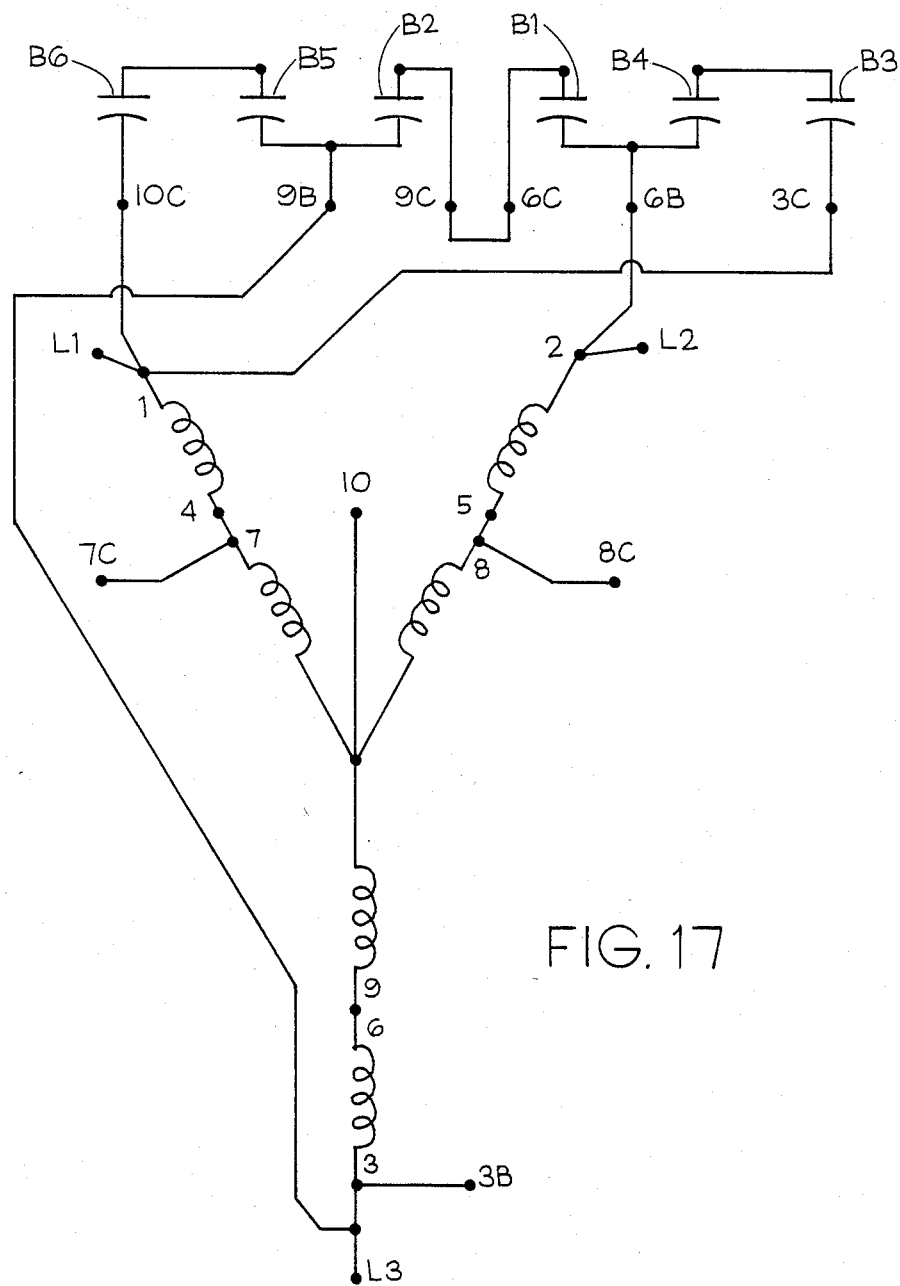
FIG. 17 illustrates the circuit of FIG. 15 connected to the stator windings of an AC induction motor wherein the windings are connected for three phase operation at 460 volts AC line voltage.
Figure 20:
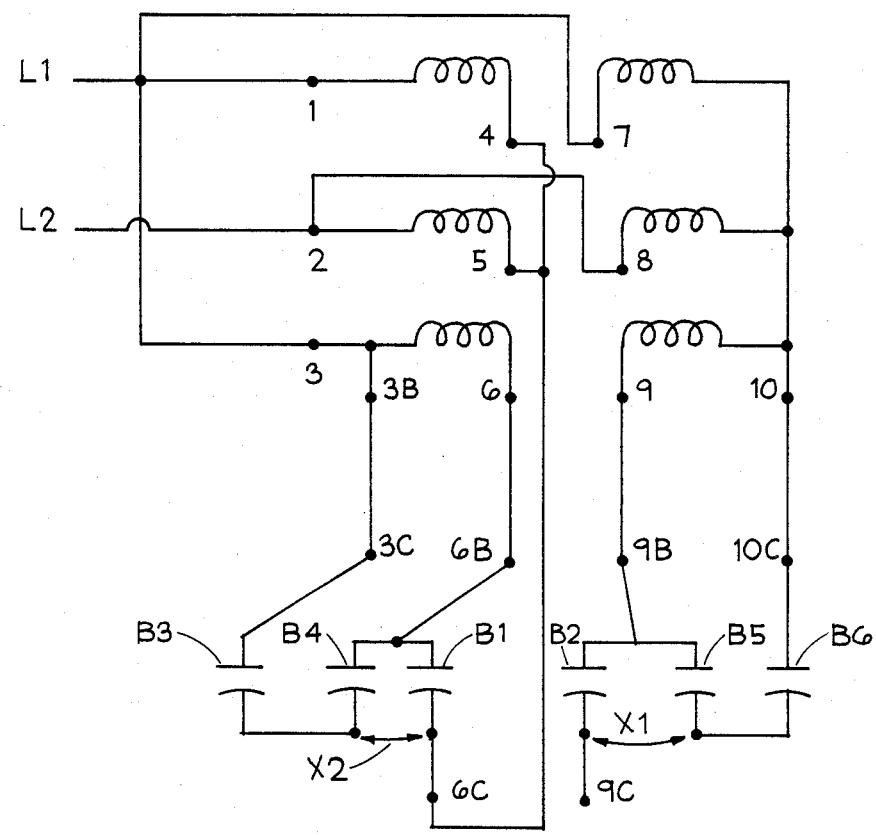
FIG. 20 illustrates the circuit of FIG. 19 wherein the stator windings are connected for operation at 230 volts AC, one phase.
Figure 21:
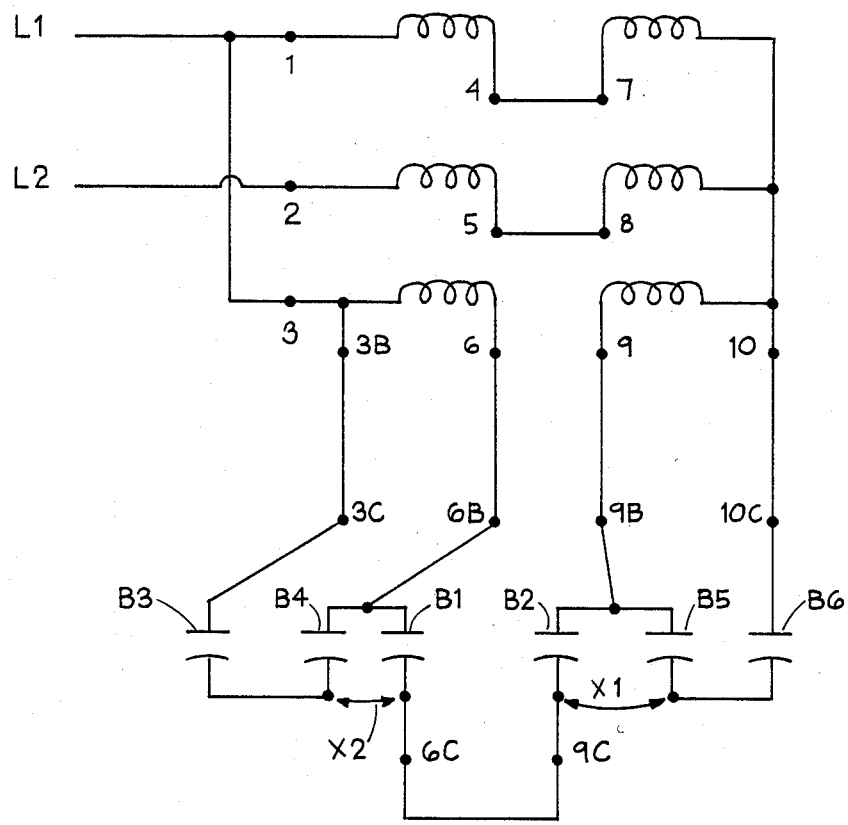
FIG. 21 illustrates the circuit of FIG. 19 wherein the stator windings are connected for operation at 460 volts AC, one phase.

There now will be described the manner in which the three phase, Y connected motor is connected for three phase operation, using the running capacitors of the circuit of FIG. 11 for power factor correction. FIG. 14 shows the winding of the motor and FIG. 15 shows only the running capacitors. For 460 volt connection (FIG. 17) jumpers X1 and X2 are removed. The relay and control circuit is disconnected and not used in either the 230 volt connection of FIG. 16 or the 460 volt connection of FIG. 17. In the 230 volt connection of FIG. 16, two banks of the running capacitors are connected in parallel between each phase and the Y connection. In the 460 volt connection of FIG. 17, two banks of the running capacitors are connected in series between phases 1-2, 2-3, and 1-3 to raise the voltage rating of the capacitors to withstand the high voltage of the circuit. By this design, a multi-phase, dual voltage, high power factor, high efficient, electric motor is provided with power factor correction when operated with three phase power. The circuit connections of FIGS. 16 and 17 also may be used for very large motors, possibly up to several hundred horsepower wherein they are started mechanically.

Referring to FIGS. 18-21, there is illustrated motor windings which may be used for dual voltage and multi-phase wherein the relay E, the starting capacitors A1, A2, contactors D1 and D2, and the relay coil 27 are not employed. The motor of these figures is designed to be started and brought to near full RPM by mechanical means. The principle of this motor is the same as the other windings in every way except the starting circuits. The capacitors shown are running capacitors. This design is intended to be used for motors which are too large to be practical to be self starting; or for those applications which have no need for high starting torque.

In one embodiment, the starting capacitors are electrolitic capacitors rated at 250 volts and 270–324 microfarads. The running capacitors are oil filled capacitors and are rated at 370 volts and 35–50 microfarads. The capacitance of the running capacitors depends upon the size of the motor and is larger for larger motors and smaller for smaller motors.

The average efficiency of motors (3HP–15HP, 1200 RPM) using the present invention operated on one phase is 0.89 (some exceed 0.9) and operated on three phase is 0.85. The power factor for the same motors is: one phase-0.884 and three phase-0.775 (without PF correction). These values are from prototypes which could be considered stock models as shown in FIGS. 3–9. These smaller motors (3–15HP) will have a lower efficiency and lower power factor than larger motors. One test model shown in FIGS. 10–17 (15HP, 1200 RPM) had these values: RPM—1155, AMPS—26.5, volts —498, KVA—13.2, KW—12.15, PF—0.92, and efficiency—0.92 when loaded to 15 HP, one phase. The load was by electromagnetic dynamometer. These values are possible and practical because the motor is built from a Y connected, three phase motor, available in all HP sizes and speeds. This design produces a motor of high efficiency and power factor.

The limit in size is controlled by the ability of the power system to operate the motor. Larger sizes may be started by mechanical means as described above. A 300 HP motor, started by mechanical means would pull less than 40 amps from a 7200 primary, one phase (full load).

Although the capacitor banks A1, A2, B1, B2, B3, B4, B5, and B6 are each shown as single capacitors, it is to be understood that each of these capacitor banks may comprise one or more capacitors connected together in parallel.

I claim:

1. A system for use with an A-C three phase motor for allowing said motor to be connected for operation on one phase power, said motor having a Y connected stator winding comprising three windings, each winding comprising first and second winding sections, each winding section having two ends, said first winding sections having first ends connected together at a common point, said second winding sections having first ends connectable to line voltage, two of said first winding sections having ends opposite their first ends adapted to be connected to line voltage or to the ends of two of said second windings opposite their first ends, comprising:

first coil means for controlling two normally open contact means, a first pair of leads coupled to opposite ends of said first coil means and connectable to the ends of said two of said first winding sections opposite their first ends thereof, a second coil means for controlling a normally closed contact means connected to one of said first pair of leads, a second pair of leads coupled to opposite ends of said second coil means and connectable across the other of said second winding sections such that when line voltage is applied to said three windings, said first coil means closes said two normally open contact means and as the motor RPM increases, a counter EMF voltage on said second pair of leads causes said second coil means to open said normally closed contact means thereby allowing said two normally open contact means to open, first and second circuits each of which comprises a starting circuit and a running circuit connected together in parallel, each starting circuit comprising one of said two pairs of normally open contact means and a starting capacitor, each of said running circuits comprising a running capacitor, one end of said first circuit being connectable to the end of said other of said second winding sections opposite its first end thereof which is adapted to be connected to line voltage, one end of said second circuit being connectable to the end of the other of said first winding sections opposite its first end thereof which is connected to said common point, for operation of said motor at a first line voltage level, the other end of said first circuit being connectable to the ends of said two of said second winding sections opposite their first ends thereof which are adapted to be connected to line voltage and the other end of said second circuit being connectable to line voltage, for operation of said motor at a line voltage level greater than said first line voltage level, the other ends of said first and second circuits being connectable together.

2. The system of claim 1, comprising:

a power factor correction capacitor connectable to line voltage and to said other end of said first circuit and a power factor correction capacitor connectable to the other end of said second circuit and to said common point of said stator winding.

3. The system of claim 1, comprising:

two power factor correction capacitors, one of which is connectable across said capacitor of said running circuit of said first circuit and the other of which is connectable to line voltage and to said other end of said first circuit, two additional power factor correction capacitors, one of which is connectable across said capacitor of said running circuit of said second circuit and the other of which is connectable to the other end of said second circuit and to said common point of said stator winding.

4. A three phase motor connected for one phase operation comprising:

a Y connected stator winding comprising three windings, each winding comprising first and second winding sections, each winding section having two ends, said first winding sections having first ends connected together at a common point, two of said first winding sections having ends opposite their first ends adapted to be connected to line voltage, said second winding sections having first ends adapted to be connected to line voltage, first coil means for controlling two normally open contact means, a first pair of leads coupled to opposite ends of said first coil means and connected to the ends of said two of said first winding sections opposite their first ends thereof, second coil means for controlling a normally closed contact means connected to one of said first pair of leads, a second pair of leads coupled to opposite ends of said second coil means and connected across one of said second winding sections such that when line voltage is applied to said three windings, said first coil means closes said two normally open contact means and as the motor RPM increases, a counter EMF voltage on said second pair of leads causes said second coil means to open said normally closed contact means thereby allowing said two normally open contact means to open, first and second circuits each of which comprises a starting circuit and a running circuit connected together in parallel, each starting circuit comprising one of said two pairs of normally open contact means and a starting capacitor, each of said running circuits comprising a running capacitor, one end of said first circuit being connected to the end of said one of said second winding sections opposite its first end thereof which is adapted to be connected to line voltage, the other end of said first circuit being connected to the ends of the other two of said second winding sections opposite their first ends thereof which are adapted to be connected to line voltage, one end of said second circuit being connected to the end of the other of said first winding sections opposite its first end thereof which is connected to said common point, the other end of said second circuit being connectable to line voltage.

5. The three phase motor of claim 4, comprising:

a power factor correction capacitor connectable to line voltage and to the other end of said first circuit, and a power factor correction capacitor connectable to the other end of said second circuit and to said common point of said stator winding.

6. The three phase motor of claim 4, comprising:

two power factor correction capacitors, one of which is connected across said capacitor of said running circuit of said first circuit and the other of which is connectable to line voltage and to the other end of said first circuit, two additional power factor correction capacitors, one of which is connected across said capacitor of said running circuit of said second circuit and the other of which is connected to the other end of said second circuit and to said common point of said stator winding.

7. A three phase motor connected for one phase operation comprising:

a Y connected stator winding comprising three windings, each winding comprising first and second winding sections, each winding section having two ends, said first winding sections having first ends connected together at a common point, said second winding sections having first ends adapted to be connected to line voltage, two of said first winding sections having ends opposite their first ends connected to the ends of two of said second windings opposite their first ends, first coil means for controlling two normally open contact means, a first pair of leads coupled to opposite ends of said first coil means and connected to the ends of said two of said first winding sections opposite their first ends thereof, second coil means for controlling a normally closed contact means connected to one of said first pair of leads, a second pair of leads coupled to opposite ends of said second coil means and connected across the other of said second winding sections such that when line voltage is applied to said three windings, said first coil means closes said two normally open contact means and as the motor RPM increases, a counter EMF voltage on said second pair of leads causes said second coil means to open said normally closed contact means thereby allowing said two normally open contact means to open, first and second circuits each of which comprises a starting circuit and a running circuit connected together in parallel, each starting circuit comprising one of said two pairs of normally open contact means and a starting capacitor, each of said running circuits comprising a running capacitor, one end of said first circuit being connected to the end of said other of said second winding sections opposite its first end thereof which is adapted to be connected to line voltage, one end of said second circuit being connected to the end of the other of said first winding sections opposite its first end thereof which is connected to said common point, the other ends of said first and second circuits being connected together.

8. The three phase motor of claim 7, comprising:

a power factor correction capacitor connectable to line voltage and to the other end of said first circuit, and a power factor correction capacitor connectable to the other end of said second circuit and to said common point of said stator winding.

9. The three phase motor of claim 7, comprising:

two power factor correction capacitors, one of which is connected across said capacitor of said running circuit of said first circuit and the other of which is connectable to line voltage and to the other end of said first circuit, two additional power factor correction capacitors, one of which is connected across said capacitor of said running circuit of said second circuit and the other of which is connected to the other end of said second circuit and to said common point of said stator winding.

10. A system for use with an A-C three phase motor for allowing said motor to be connected for operation on one phase power or for increasing the efficiency and power factor of said motor, said motor having a Y connected stator winding comprising three windings, each winding comprising first and second winding sections, each winding section having two ends, said first winding sections having first ends connected together at a common point, said second winding sections having first ends connectable to line voltage, two of said first winding sections having ends opposite their first ends adapted to be connected to line voltage or to the ends of two of said second windings opposite their first ends, comprising:

first coil means for controlling two normally open contact means, a first pair of leads coupled to opposite ends of said first coil means and connectable to the ends of said two of said first winding sections opposite their first ends thereof, a second coil means for controlling a normally closed contact means connected to one of said first pair of leads, a second pair of leads coupled to opposite ends of said second coil means and connectable across the other of said second winding sections such that when line voltage is applied to said three windings, said first coil means closes said two normally open contact means and as the motor RPM increases, a counter EMF voltage on said second pair of leads causes said second coil means to open said normally closed contact means thereby allowing said two normally open contact means to open, first and second circuits each of which comprises a starting circuit and a running circuit connected together in parallel, each starting circuit comprising one of said two pairs of normally open contact means and a starting capacitor, each of said running circuits comprising a running capacitor, one end of said first circuit being connectable to the end of said other of said second winding sections opposite its first end thereof which is adapted to be connected to line voltage, one end of said second circuit being connectable to the end of the other of said first winding sections opposite its first end thereof which is connected to said common point, for operation of said motor at one phase power at a first line voltage level, the other end of said first circuit being connectable to the ends of said two of said second winding sections opposite their first ends thereof which are adapted to be connected to line voltage and the other end of said second circuit being connectable to line voltage, for operation of said motor at one phase power at a line voltage level greater than said first line voltage level, the other ends of said first and second circuits being connectable together, two power factor correction capacitors, one of which is connectable across said capacitor of said running circuit of said first circuit and the other of which is connectable to line voltage and to said other end of said first circuit, two additional power factor correction capacitors, one of which is connectable across said capacitor of said running circuit of said second circuit and the other of which is connectable to the other end of said second circuit and to said common point of said stator winding.

* * * * *